(12) United States Patent
Griffin et al.

(10) Patent No.: US 8,412,279 B2
(45) Date of Patent: Apr. 2, 2013

(54) HANDHELD ELECTRONIC COMMUNICATION DEVICE INCLUDING TOUCH-SENSITIVE DISPLAY

(75) Inventors: Jason Tyler Griffin, Kitchener (CA); Todd Andrew Wood, Guelph (CA)

(73) Assignee: Research In Motion Limited, Waterloo (CA)

( * ) Notice: Subject to any disclaimer, the term of this patent is extended or adjusted under 35 U.S.C. 154(b) by 163 days.

(21) Appl. No.: 12/776,880

(22) Filed: May 10, 2010

(65) Prior Publication Data

US 2011/0275413 A1 Nov. 10, 2011

(51) Int. Cl.
*H04M 1/00* (2006.01)

(52) U.S. Cl. .................. 455/566; 455/575.1; 455/575.4; 455/550.1; 379/433.11; 379/433.12; 379/433.04; 379/433.01; 379/428.01; 439/31

(58) Field of Classification Search ............... 455/575.4, 455/575.1, 550.1, 556, 566; 439/31; 379/433.11, 379/433.12, 433.04, 433.01, 428.01
See application file for complete search history.

(56) References Cited

U.S. PATENT DOCUMENTS

| | | | |
|---|---|---|---|
| 5,494,447 A * | 2/1996 | Zaidan | 439/31 |
| 6,243,595 B1 | 6/2001 | Lee et al. | |
| 6,332,084 B1 | 12/2001 | Shaanan et al. | |
| 6,850,226 B2 | 2/2005 | Finke-Anlauff | |
| 6,963,756 B2 | 11/2005 | Lubowicki et al. | |
| 7,388,578 B2 | 6/2008 | Tao | |
| 7,580,736 B2 | 8/2009 | Ronkko et al. | |
| 7,916,473 B2 * | 3/2011 | Jang | 361/679.55 |
| 2005/0096082 A1 | 5/2005 | Chang | |
| 2005/0233785 A1* | 10/2005 | Park et al. | 455/575.4 |
| 2007/0115255 A1 | 5/2007 | Pan | |
| 2007/0177404 A1 | 8/2007 | Daniel et al. | |
| 2007/0247798 A1 | 10/2007 | Scott, II | |
| 2007/0285401 A1 | 12/2007 | Ohki et al. | |
| 2008/0144265 A1 | 6/2008 | Aoki | |
| 2008/0207273 A1 | 8/2008 | Huo | |
| 2008/0268901 A1 | 10/2008 | Miramontes | |
| 2009/0154082 A1 | 6/2009 | Nurmi et al. | |
| 2009/0156264 A1 * | 6/2009 | Cho et al. | 455/566 |
| 2009/0233660 A1 | 9/2009 | Demuynck | |
| 2010/0093409 A1 * | 4/2010 | Jokinen et al. | 455/575.4 |

FOREIGN PATENT DOCUMENTS

| | | |
|---|---|---|
| EP | 1603311 A2 | 12/2005 |
| EP | 1 617 631 A2 | 1/2006 |
| EP | 1858236 A1 | 11/2007 |
| EP | 1 617 631 A3 | 9/2008 |
| WO | 03/030497 A2 | 4/2003 |
| WO | 03/049078 A1 | 6/2003 |
| WO | 2008/074358 A1 | 6/2008 |

OTHER PUBLICATIONS

Extended European Search Report dated Oct. 21, 2010 issued from the corresponding European patent application.
Extended European Search Report dated Oct. 22, 2010 issued from the European patent application No. 10162469.0.
http://www.mobileshop.com/blog/mobile-phone-news/futuristic-concept-phones-the-mobile-phone-with-the-bendy-screen/—published at least as early as Nov. 21, 2008.

\* cited by examiner

*Primary Examiner* — Junpeng Chen
(74) *Attorney, Agent, or Firm* — Geoffrey deKleine; Borden Ladner Gervais LLP (57) ABSTRACT

A handheld electronic communication device includes a body including an input device and a display assembly including a display. The display assembly is connected to the body and moveable relative to the body, between a first position in which a first portion of the display is covered by the body and a second portion of the display is exposed, and a second position in which the display assembly is displaced such that the first portion of the display and the second portion of the display are exposed and the display assembly is generally flush with the body.

10 Claims, 6 Drawing Sheets

HANDHELD ELECTRONIC COMMUNICATION DEVICE INCLUDING TOUCH-SENSITIVE DISPLAY

FIELD OF TECHNOLOGY

The present disclosure relates to electronic devices, including handheld electronic communication devices having a touch-sensitive display.

BACKGROUND

Electronic devices, including handheld electronic communication devices, have gained widespread use and may provide a variety of functions including, for example, telephonic, electronic text messaging and other personal information manager (PIM) application functions. Handheld electronic communication devices can include several types of devices including mobile stations such as simple cellular phones and smart phones.

Devices such as smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Figure 1:
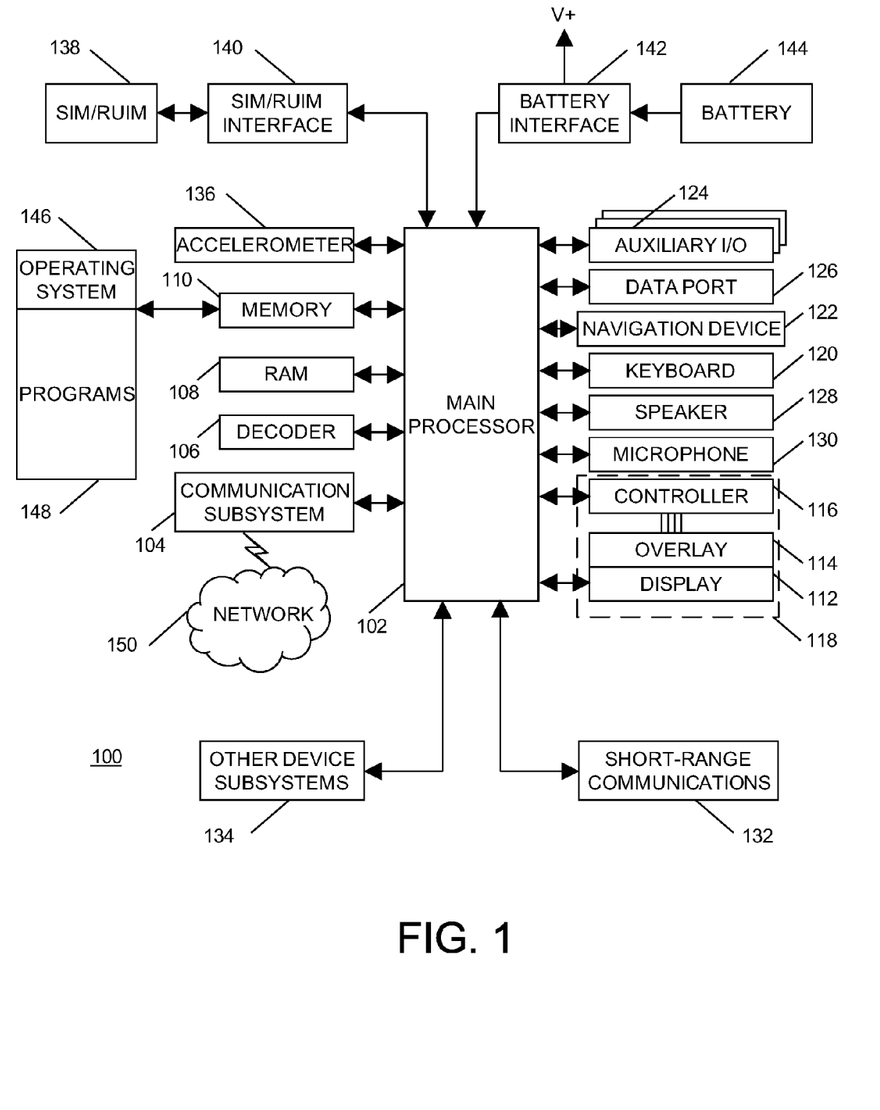
FIG. 1 is a simplified block diagram of components including internal components of a handheld electronic communication device according to an example embodiment.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an input device 120, an optional navigation device 122, an auxiliary input/output (I/O) subsystem 124, a data port 126, a speaker 128, a microphone 130, short-range communications 132 and other device subsystems 134. User-interaction with the graphical user interface may be performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. Although the touch-sensitive display 118 is described as comprising a display 112 and an overlay 114, the touch-sensing components may overlay the display 112 or, alternatively, may be integrated into the display 112.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Referring to FIG. 2A through FIG. 4B, views of an example of the handheld electronic communication device 100 are shown. The handheld electronic communication device 100 generally includes a body 202 that has the input device 120, and a display assembly 206 that includes the display 112. The display assembly 206 is connected to the body 202 and is moveable relative to the body 202, between a first position shown in FIG. 2A and FIG. 2B in which a first portion of the display 112 is covered by the body 202 and a second portion of the display 112 is exposed, and a second position shown in FIG. 4A and FIG. 4B in which the display assembly 206 is displaced such that the first portion of the display 112 and the second portion of the display 112 are exposed and the display assembly 206 is generally flush with the body 202.

Figure 5A:
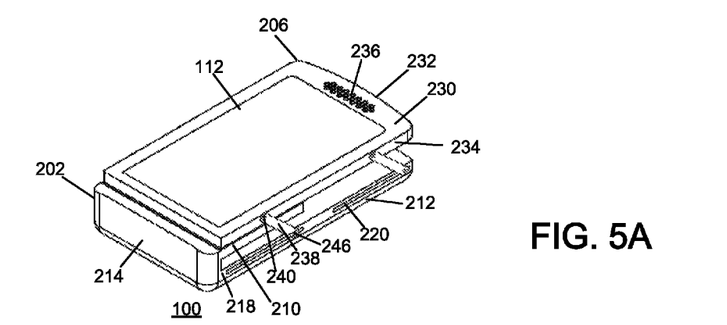
FIG. 5A is a perspective view of the example of the handheld electronic communication device including the display assembly in a third position.
Figure 5B:
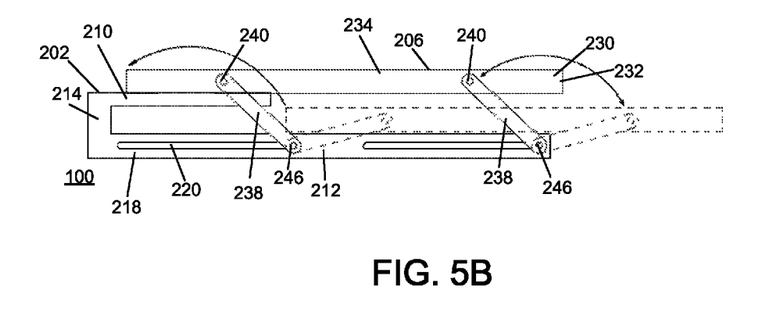
FIG. 5B is a side view of the example of the handheld electronic communication device of FIG. 5A.
Figure 6:
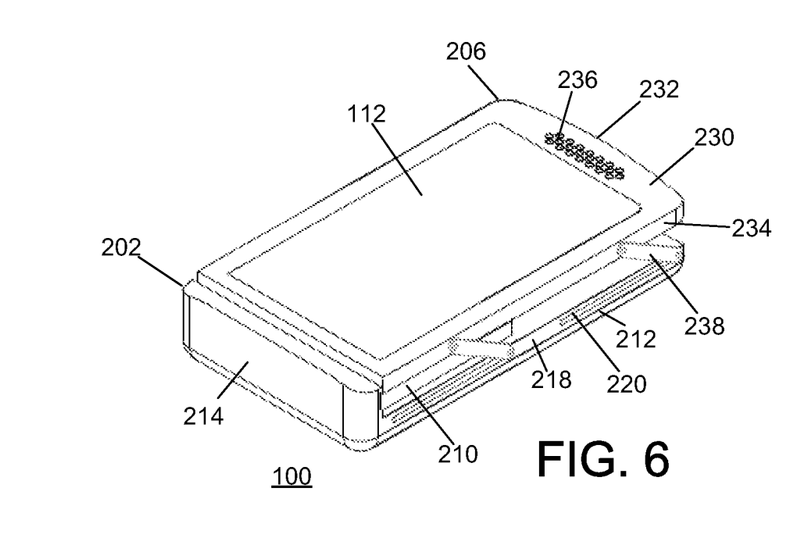
FIG. 6 is a perspective view of the example of the handheld electronic communication device including the display assembly in a fourth position.

The display assembly 206 is also moveable into a third position shown in FIG. 5A and FIG. 5B. When the display assembly 206 is in the third position, the first portion and the second portion of the display 112 are exposed and the display assembly 206 covers the input device 120 so that the input device 120 is hidden by the display assembly 206. From the third position, the input device 120 and display assembly 206 are moveable toward a back of the body 202, into a fourth position shown in FIG. 6.

The body 202 includes a front and a back 212 connected to the back 212 by a flange 214 that extends between the back 212 and the front 210. The flange 214 is unitary with the back 212 and is connected to the back 212 to provide a closed end of the body 202. The flange 214 is suitably sized to provide a space between the front 210 and the back 212 in which the display assembly 206 is movable into and out of.

Figure 2A:
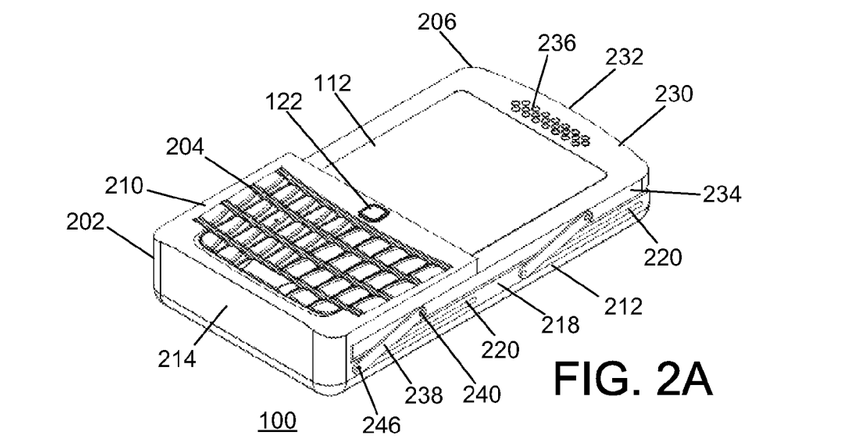
FIG. 2A is a perspective view of an example of a handheld electronic communication device including a display assembly in a first position.
Figure 2B:
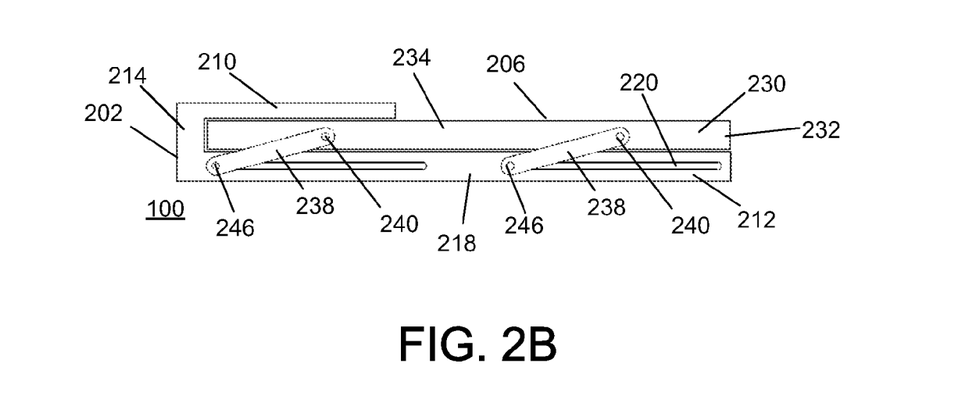
FIG. 2B is a side view of the example of the handheld electronic communication device of FIG. 2A.
Figure 3A:
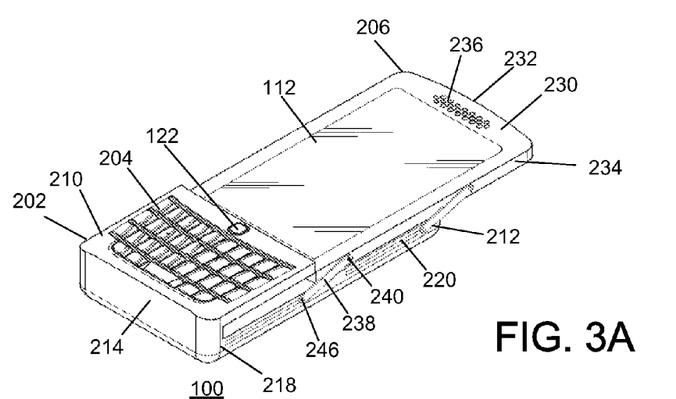
FIG. 3A is a perspective view of the example of the handheld electronic communication device including the display assembly intermediate the first position and a second position.
Figure 4A:
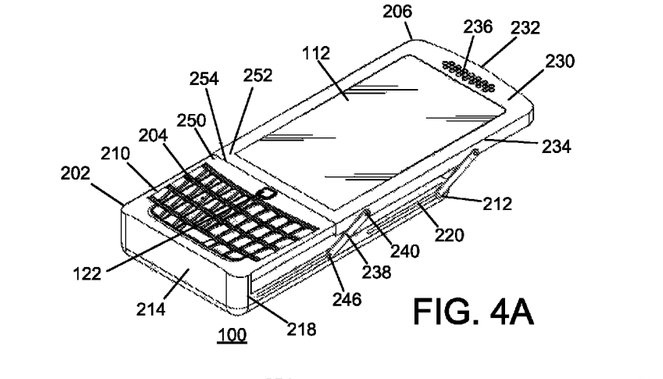
FIG. 4A is a perspective view of the example of the handheld electronic communication device including the display assembly in a second position.

The front 210 of the body 202 extends generally parallel to the back 212, and the front 210 includes the input device 120, which may be, for example, a mechanical keyboard, as shown in FIG. 2A, FIG. 3A, and FIG. 4A. The input device 120 is substantially the same width as the display 112. The front 210 may also include a navigation device 122 such as a trackball, a touchpad, or optical joystick. Alternatively, the input device 120 may be a keypad, a touch-sensitive pad, or trackpad, a touch-sensitive display, or any other suitable device for input. The input device 120 is exposed for use in FIG. 2A, FIG. 2B, FIG. 4A, and FIG. 4B and is covered by the display assembly 206 in FIG. 5A, FIG. 5B, and FIG. 6. The input device 120 is electrically connected to the processor 102. Similarly, the display 112 is electrically connected to the processor 102.

The front 210 extends less than half the distance from the flange 214 as compared to the distance that the back 212 extends from the flange 214 and the front 210 and back 212 are connected by the flange 214 at the closed end 216 of the body. The front 210 is slideable along the flange 214, for example, along sliding elements, between a spaced position shown in FIG. 2A through FIG. 5B, in which the front 210 is spaced from the back 212, and a closed position shown in FIG. 6 in which the front 210 is moved closer to the back 212. Alternatively, the front 210 may be pivotable relative to the flange 214, utilizing a pivotal connection.

The front 210, the flange 214 and the back 212 form a cavity when the front 210 is in the spaced position, to receive the display assembly 206. In the present example, the cavity has open sides. Alternatively, the sides of the cavity may be closed by, for example, side flanges.

Referring now to FIG. 2A through FIG. 6, the back 212 of the body 202 includes opposing sides 218. Each side 218 includes a pair of slots 220 that extend longitudinally along the side 218 such that sides of the slot are generally parallel with edges of the sides 218 of the back 212. Each slot 220 is about equivalent in length to the other slots 220 and each slot 220 on each side 218 is a parallel, mirror image of a slot 220 on the opposing side 218. Each slot 218 includes a necked-down edge such that the slot is wider at an interior portion of the slot 220 than at the outer edge, to retain, within the slot 220, a head of a pin that is slideable along the slot 220.

The display assembly 206 includes the display 112 which may be an LCD display. Optional components including a backlight may also be included. The display 112 in the present example is part of the touch-sensitive display 118 including the touch-sensitive overlay 114 to detect touches thereon. The display assembly 206 includes a display housing 230 that houses and frames the display 112. The display housing 230 is generally rectangular with opposing parallel short sides 232 and opposing parallel long sides 234. The display housing 230, in the example shown, includes a speaker 236 adjacent a short side 232 of the display housing 230, between the short side 232 of the display housing 230 and the short side of the display 112 that is exposed when the display assembly 206 is in the first position shown in FIG. 2A and FIG. 2B. The touch-sensitive display 112, including the display 112, is electrically connected to the processor 102 by a flexible connection to facilitate movement of the display assembly 206 relative to the body 202.

Four linkage arms 238 extend from and are pivotally connected to the long sides 234 of the display housing 230 by, for example, pivot pins 240 that interconnect one end of each of the linkage arms 238 to a long side 234 of the display housing 230 to provide a sliding mechanism. Two linkage arms 238 are pivotally connected at the end, to each long side 234, at spaced apart positions along each long side 234. The opposing end of each of the linkage arms 238 is connected to a side 218 of the body 202 by a sliding pin 246 that extends into a respective one of the slots 220. A head of each sliding pin 246 is wider than the necked down edge of the slots 220 to retain the sliding pins 246 within the slots 220. The sliding pins 246 are slideable along the length of the slots 220 and are pivotable within the slots 220.

When the display assembly 206 is in the first position shown in FIG. 2A and FIG. 2B, the display assembly 206 is adjacent the back 212 of the body 202 and a portion of the display assembly 206 is disposed in the cavity between the back 212 and the front 210. The ends of the linkage arms 238 are located such that the sliding pins 246 are located at the ends of each of the slots 220, that are located closest to the flange 214. One of the short sides 218 of the display assembly 206 is therefore located in the cavity.

Figure 3B:
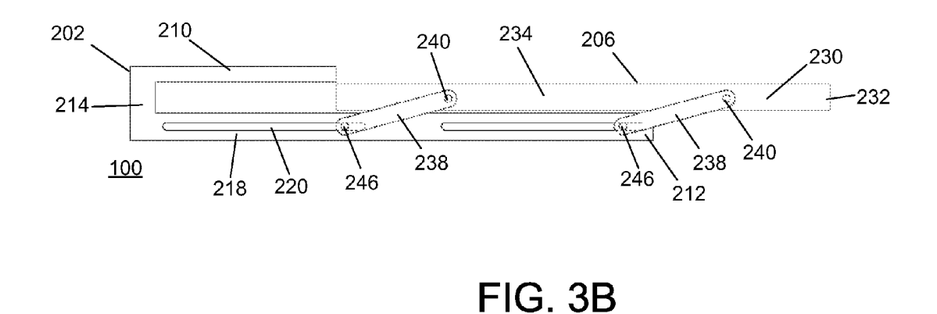
FIG. 3B is a side view of the example of the handheld electronic communication device of FIG. 3A.
Figure 4B:
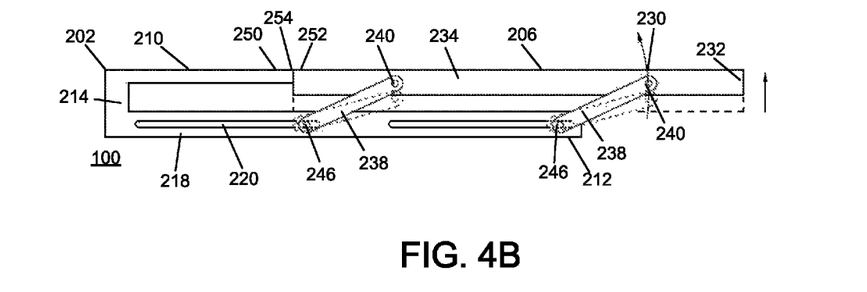
FIG. 4B is a side view of the example of the handheld electronic communication device of FIG. 4A.

To move the display assembly 206 from the first position to the second position shown in FIG. 4A and FIG. 4B, the display assembly 206 is manually displaced such that the linkage arms slide 238, relative to the body 202, and the sliding pins 246 slide to an opposite side of each of the slots 220, near an opposite end of each of the slots, as shown in FIG. 3A and FIG. 3B. The display assembly 206 is then moved away from the back 212 as each linkage arm 238 pivots about the pivot pin 240 and about the sliding pin 246, as shown in FIG. 4A and FIG. 4B. In the second position, the display assembly 206 is generally flush with the input device 120 as an outer surface 252 of the display assembly 206 generally lies in the same plane as an outer surface 250 of the front 210 in the presently shown example embodiment. The surfaces 250, 252 are flush in that their adjacent edges meet at or near a line along the point 254 shown in FIG. 4A and FIG. 4B, which is coplanar with the surfaces 250, 252. The short side 232 of the display assembly 206 that is located in the cavity in the first position, is adjacent an edge of the input device 120, distal the flange 214 in the second position. The handheld electronic communication device 100 is may be utilized in the position shown in FIGS. 3A and 3B or may be utilized in the position shown in FIGS. 4A and 4B and may be equally operational in both positions.

The display assembly 206 is moved from the second position to the third position as the display assembly 206 is moved further away from the back 212. The pivot arms 238 move further along the slots 220 to the ends of each slot 220 and are further pivoted about the pivot pin 240 and about the sliding pin 246 to move the display assembly 206 further away from the back 212. The display assembly 206 is displaced in the direction of the flange 214 to cover the input device 120 as shown in FIG. 5A and FIG. 5B. From the third position shown in FIG. 5A and FIG. 5B, the display assembly 206 is depressed, toward the back 212, into the fourth position shown in FIG. 6. The display assembly 206 may be retained in the fourth position by a spring-loaded locking mechanism, for example. When the display assembly 206 is in the third position, depression of the display assembly may lock the display assembly 206 and the front 210 of the body 202, including the input device 120, in the fourth position. When the display assembly 206 is in the fourth position, depression of the display assembly 206 may unlock the display assembly 206 and the front 210 and cause the display assembly 206 and the input device 120 to return to the third position.

Movement of the display assembly 206 is facilitated by the linkage arms 238 and the pivotal connection of the linkage arms 238 with the display assembly 206 as well as the pivotal and sliding engagement of the linkage arms 238 with the slots 220. The display assembly 206 may be returned to any of the positions described herein by movement in the reverse direction. A biasing mechanism such as detents may be utilized to facilitate locating of the positions when moving the display assembly 206 and to bias the display assembly 206 into at least one of the positions. Further, movement of the display assembly 206 may be facilitated by, for example, spring loading to bias the display assembly 206 into one of the positions. For example, movement from the first position to the second position may be facilitated by a spring. As described above, movement from the fourth position to the third position may also be facilitated by a spring.

The body 202 and the display assembly 206 may both house components of the handheld electronic communication device 100, including the components described and shown in FIG. 1.

As indicated above, the display 112 is part of a touch-sensitive display 118. The touch-sensitive overlay 114 of the touch-sensitive display 118 may be selectively operable such that the touch-sensitive overlay 114 is activated or operable in at least one of the positions of the display assembly 206 and not activated or inoperable in at least one of the other positions of the display assembly 206. For example, the touch-sensitive overlay 114 may be inoperable when the display assembly 206 is in the first position. The touch-sensitive overlay may be operable when the display assembly 206 is in the second position, third position, and fourth position. Many different devices may be utilized for detection of the position of the display assembly 206 relative to the body 202. For example, a Hall effect sensor may be utilized to detect a position or positions of the display assembly 206 relative to the body 202. The sensor may be utilized, for example, to enable interface elements, such as display of selectable features, on the second portion of the display when the display assembly is in the second position. According to another example, a mechanical switch or switches are utilized to detect a position or positions of the display assembly 206.

Optionally, the portion of the display 112 that is covered by the front 210 of the body 202 when the handheld electronic communication device 100 is in use with the display assembly 206 in the first position, may be turned off or may be utilized in a low-power mode, for example, by displaying a color that consumes less power to save battery power. In a particular example in which the display 112 is an OLED display, the portion of the display 112 that is covered by the front 210 may display black pixels.

In the example embodiments shown and described herein, the display assembly 206 is connected to the body 202 by a sliding mechanism that includes slots in the sides of the body 202 and linkage arms 238 that are pivotable about the display assembly 206 and pivotable and slidable along the slots. In an alternative embodiment, the display assembly 206 may include slots rather than the body 202 including slots. In this alternative example, the linkage arms may be pivotally connected to the body 202 and be pivotally connected and slideable along the slots in the display assembly. 206.

The handheld electronic communication device 100 described herein includes multiple positions of the display assembly relative to the body. Thus, the display assembly is moveable relative to the body to provide different device forms, commonly referred to as form factors. The positions provide a display with a keyboard, an extended portrait orientation display with the keyboard and a portrait orientation without a keyboard. Thus, the handheld electronic communication device may be stored or utilized in a compact position and the screen may be fully exposed for viewing more information at one time while still providing a keyboard or other input device. Further, the handheld electronic communication device may be utilized in a compact position without the keyboard. The orientation of the display can be selected based on the type of information displayed.

According to one aspect, a handheld electronic communication device is provided. The handheld electronic communication device includes a body including an input device and a display assembly including a display. The display assembly is connected to the body and moveable relative to the body, between a first position in which a first portion of the display is covered by the body and a second portion of the display is exposed, and a second position in which the display assembly is displaced such that the first portion of the display and the second portion of the display are exposed and the display assembly is generally flush with the body.

According to another aspect, a handheld electronic communication device is provided. The handheld electronic communication device includes a body including a back and a front defining a cavity. The front includes a keyboard having keys. The handheld electronic communication device also includes a display assembly. The display assembly includes a display having a width that is substantially the same width as the keyboard. The display assembly is connected to the body by a sliding mechanism and moveable relative to the body, between a first position in which a first portion of the display is disposed in the cavity and is covered by the front and a second portion of the display is exposed, and a second position in which the display assembly is displaced from the cavity such that the first portion of the display and the second portion of the display are exposed, the display assembly being biased into at least one of the first position and the second position. A sensor cooperates with the body and the display assembly to detect when the display is in at least one of the first position and the second position. A processor is disposed in one of the body and the display assembly, and at least one flexible electrical connection connects the processor to the keyboard, the display, and the sensor, Interface elements are enabled on the second portion of the display when the display assembly is in the second position.

While the embodiments described herein are directed to particular implementations of the actuating assembly and the handheld electronic communication device and the, it will be understood that modifications and variations may occur to those skilled in the art. All such modifications and variations are believed to be within the sphere and scope of the present disclosure.

What is claimed is:

1. A handheld electronic communication device comprising:
    a body including an input device;
    a display assembly comprising a touch-sensitive display, the display assembly connected to the body and moveable by sliding relative to a back of the body, between a first position in which the touch-sensitive display is disposed within a cavity between a front and the back of the body and a first portion of the touch-sensitive display is covered by the body and a second portion of the touch-sensitive display is exposed, and a second position in which the display assembly is moved away from the back of the body,
    wherein, in the second position, the first portion of the touch-sensitive display and the second portion of the touch-sensitive display are both fully exposed and the display assembly is generally flush with the front of the body, and
    wherein the display assembly is moveable, relative to the body, into a third position in which the input device is covered by the display assembly, and
    wherein the display assembly is moveable by sliding, from the third position, in which the front of the body is spaced from the back of the body, into a fourth position in which the display assembly is moved closer to the back of the body and the input device is disposed between the display assembly and the back of the body, and
    wherein, in the first position, the first portion of the touch-sensitive display is in one of a low power mode and a power off mode.

2. The handheld electronic communication device according to claim 1, wherein the display assembly and the body are connected by a sliding mechanism.

3. The handheld electronic communication device according to claim 2, wherein the sliding mechanism comprises a pivot arm extending from one of the body and the display assembly and slideable along a slot in the other of the body and the display assembly.

4. The handheld electronic communication device according to claim 2, wherein the sliding mechanism comprises pivot arms extending from the display assembly and pivotable relative to the display assembly, the pivot arms engaged with the body for sliding along the body.

5. The handheld electronic communication device according to claim 4, wherein the pivot arms are engaged with sides of the body.

6. The handheld electronic communication device according to claim 5, wherein the body includes slots and the pivot arms are engaged in the slots.

7. The handheld electronic communication device according to claim 1, wherein information rendered on the touch-sensitive display is rendered on the second portion of the touch-sensitive display when the display assembly is in the first position.

8. The handheld electronic communication device according to claim 1, wherein the input device comprises at least one of a keyboard, a keypad, a trackpad, and a touch-sensitive display.

9. The handheld electronic communication device according to claim 1, wherein the input device covers the first portion of the touch-sensitive display when the display assembly is in the first position.

10. The handheld electronic communication device according to claim 1, wherein an outer surface of the display assembly lies in the same plane as an outer surface of the input device.

* * * * *